(12) United States Patent
Oliver et al.

(10) Patent No.: US 8,456,430 B2
(45) Date of Patent: Jun. 4, 2013

(54) TACTILE USER INTERFACE FOR AN ELECTRONIC DEVICE

(75) Inventors: Manuel Oliver, Scottsdale, AZ (US); Luis M Ortiz Hernandez, Chandler, AZ (US)

(73) Assignee: Motorola Mobility LLC, Libertyville, IL (US)

( * ) Notice: Subject to any disclaimer, the term of this patent is extended or adjusted under 35 U.S.C. 154(b) by 920 days.

(21) Appl. No.: 12/545,292

(22) Filed: Aug. 21, 2009

(65) Prior Publication Data

US 2011/0043457 A1 Feb. 24, 2011

(51) Int. Cl.
*G06F 3/041* (2006.01)

(52) U.S. Cl.
USPC .......................................................... 345/173

(58) Field of Classification Search
None
See application file for complete search history.

(56) References Cited

U.S. PATENT DOCUMENTS

| 5,541,372 | A | * | 7/1996 | Baller et al. | 178/18.01 |
| 5,708,460 | A | * | 1/1998 | Young et al. | 345/173 |
| 6,573,883 | B1 | | 6/2003 | Bartlett | |
| 7,679,604 | B2 | * | 3/2010 | Uhlik et al. | 345/158 |
| 2002/0171629 | A1 | | 11/2002 | Archibald et al. | |
| 2006/0279553 | A1 | * | 12/2006 | Soss et al. | 345/173 |
| 2008/0165125 | A1 | * | 7/2008 | Hosono | 345/157 |
| 2009/0065267 | A1 | * | 3/2009 | Sato | 178/18.06 |
| 2009/0153500 | A1 | * | 6/2009 | Cho et al. | 345/173 |
| 2011/0043457 | A1 | * | 2/2011 | Oliver et al. | 345/173 |

FOREIGN PATENT DOCUMENTS

| EP | 1806643 A1 | 11/2007 |
| GB | 2313195 A | 11/1997 |
| WO | 2006000639 A1 | 1/2006 |

OTHER PUBLICATIONS

KXP74-1050; ± 2g Tri-Axis Digital Accelerometer Specifications; Dec. 1, 2006; 14 pages.
IDG-650; Integrated Dual-Axis Gyro; 2008 IvenSence, Inc.; www.ivensense.com; 8 pages.
Patent Cooperation Treaty, International Search Report and Written Opinion of the International Searching Authority for International Application No. PCT/US2010/042594, May 31, 2011, 12 pages.

* cited by examiner

*Primary Examiner* — Peter Vincent Agustin

(57) ABSTRACT

A tactile interface for an electronic device includes a compliant portion, a first input sensor embedded in the compliant portion and a second input sensor. The first and second sensors produce differential output signal in responsive to tactile input forces applied in at least a common dimension or about a common axis. A processor detects and interprets the differential output signals as a tactile input at the touch input device.

5 Claims, 5 Drawing Sheets

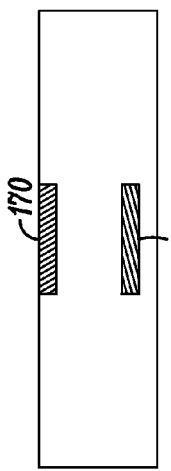
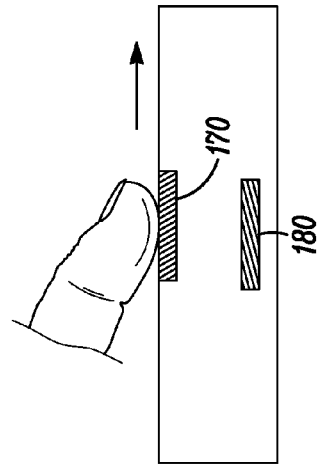
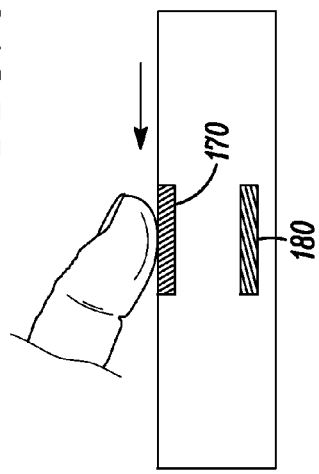
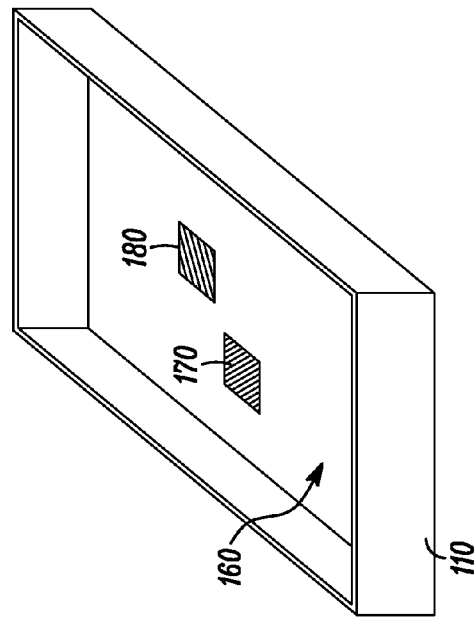

TACTILE USER INTERFACE FOR AN ELECTRONIC DEVICE

FIELD OF THE DISCLOSURE

The present disclosure relates generally to touch user interfaces for and in electronic devices and, more specifically, to a tactile input device that detects normal, lateral, rotational inputs or a combination thereof for and in electronic devices and corresponding methods.

BACKGROUND

Touch sensitive input devices for electronic devices are known generally. U.S. Pat. No. 7,190,350 entitled "Touch Screen with Rotationally Isolated Force Sensor," for example, discloses a touch screen with one or more sensors that determine the location of touch inputs on the screen. U.S. Pat. No. 7,190,350 also discloses is a pliable material that reduces the effects of distortion on the determination of the touch location.

A challenge with many input devices capable of sensing a force applied normal to a surface of the device is to reduce unnecessary pre-loading of the sensor during assembly. This problem is inherent with sensors that measure force using displacement or strain. Examples of such sensors include force sensitive resistors, strain gauges and capacitive force sensors among others. Also, in some input device applications, it is desirable to sense lateral force or displacement and/or to sense rotation. A joystick is an example of a known input device that may sense these types of inputs. However current joysticks tend to be bulky and are not easily implemented in relatively thin form factors, for example those required in cellular telephones and other thin portable electronic devices. Further, existing input device applications are associated with the significant drawback that the control does not take into consideration the environment or the operating situation in which the device is used or in which identification is performed.

The various aspects, features and advantages of the invention will become more fully apparent to those having ordinary skill in the art upon a careful consideration of the following Detailed Description thereof with the accompanying drawings described below. The drawings may have been simplified for clarity and are not necessarily drawn to scale.

BRIEF DESCRIPTION OF THE DRAWINGS

FIG. 3 illustrates a sensor arrangement in a touch input device of a portable electronic device.

DETAILED DESCRIPTION

Disclosed is a touch interface for detecting touch inputs for or in an electronic device and corresponding methods. According to one implementation, a first signal is generated in response to a touch input with a first sensor embedded in a pliable surface portion of the electronic device. A second signal is generated with a second sensor removed from the pliable portion in response to the touch input, wherein a difference between the first sensor signal and the second sensor signal is indicative of a touch input at the electronic device. A processor having an input coupled to an output of the first and second sensors determines an input signal based on a difference between the output signals of the first and the second sensors. The touch interface may be configured to detect lateral inputs in a plane substantially parallel to a surface of the touch interface, inputs normal to the surface of the touch interface, rotational inputs, and combinations thereof.

Figure 1:
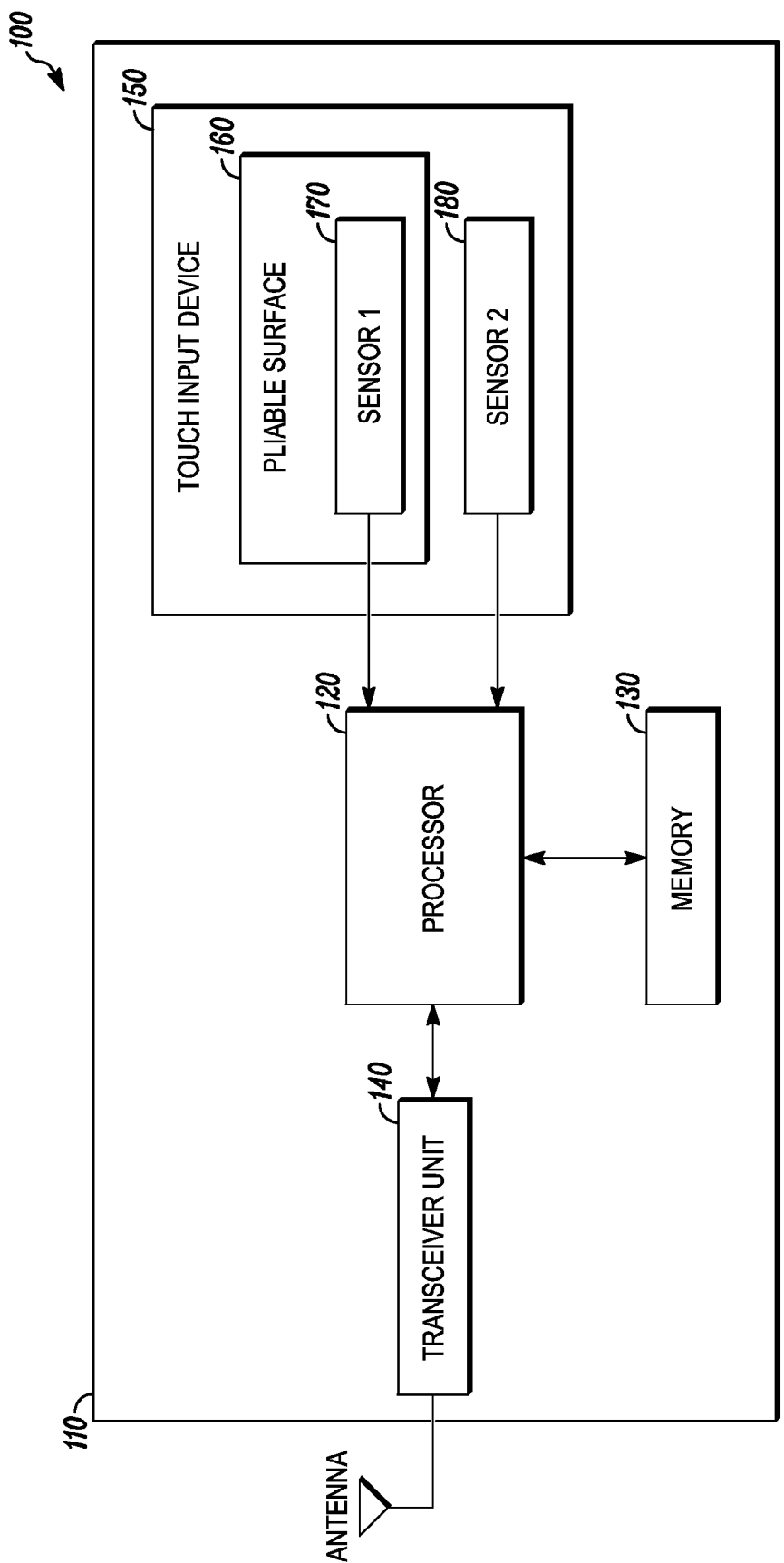
FIG. 1 is a block diagram of a portable electronic device.

In FIG. 1, a portable electronic device (PED) generally comprises a housing 110 that carries a processor 120 coupled to memory 130 and a user interface including a touch interface for receiving touch inputs from the user as discussed further below. The user interface may also include a key pad and other conventional user inputs. The PED may also include audio inputs and outputs and data input and output ports as is known generally by those having ordinary skill in the art. The processor may be embodied as one or more microprocessors, microcontrollers, digital signal processors, state machines, logic circuits, analog circuits or some other device that processes information based on operational or programming instructions, which may be embodied as firmware, or drivers or application-based software. Alternatively the processor may be embodied as one or more hardware circuits that are equivalent to a digitally programmable processor or some other programmable processor. The memory may be embodied as volatile or non-volatile memory like random access memory (RAM) or read only memory (ROM) or as a combination thereof.

The exemplary PED may be implemented as a cellular or wireless telephone, personal digital assistant (PDA), a remote control unit, and or as some other portable hand-held device. More generally, the touch input devices described herein may be employed in applications other than portable electronic device applications. Such applications include but are not limited to desktop, notebook and laptop computers, workstations, point-of-sale stations, cash machines, and automotive consoles among a vast array of other equipment that includes a user interface for which a tactile input device may be employed. Thus it should be apparent to those of ordinary skill in the art having the benefit of the description herein that the touch input devices so described may be implemented in a variety of portable and fixed host devices.

In some embodiments, the host device includes one or more transceiver units 140, which may be embodied as wireless or wire-line modems. A PED implemented as a wireless communication device may include one or more wireless transceivers compliant with corresponding wireless communication protocols, for example, DECT, GSM, UMTS, LTE and WiMAX among other protocols. Some electronic devices also include a satellite navigation receiver like a GPS, GLONASS or Galileo or other satellite receiver. Some satellite-based radio receivers like XM-Sirius receivers are also capable of being used for navigation. The PED may also include a short range transceiver like Bluetooth or IrDA for communicating with other devices.

In FIG. 1, the PED comprises a tactile or touch input device 150 including a pliable surface 160 including a tactile interaction area that is exposed or exposable on a portion of the housing where the user can interact with the pliable surface. While the surface 160 is referred to herein as being pliable, the pliability may not be readily perceptible to the user. The pliable surface 160 must be sufficiently pliable to impart a tactile input force to the sensors, which are discussed further below. Thus to some extent the minimal pliability of the pliable surface is dictated by the sensitivity of the sensors.

Exemplary materials that can be used for forming the pliable surface include but are not limited to glass, metals, plastics, and elastomers. The pliability of such materials can vary substantially depending both on the intrinsic material properties as well as the dimensions and design of the pliable surface that it forms.

Figure 2B:
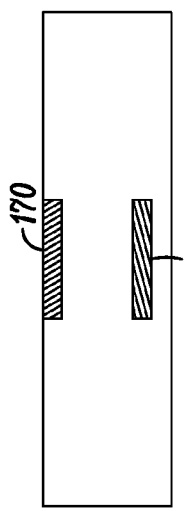
FIG. 2 illustrates a sensor arrangement in a touch input device of a portable electronic device.
Figure 2C:
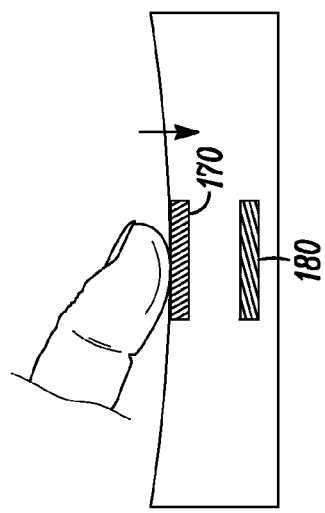
Figure 2D:
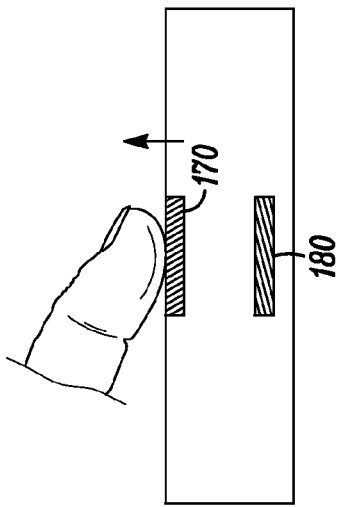
Figure 2A:
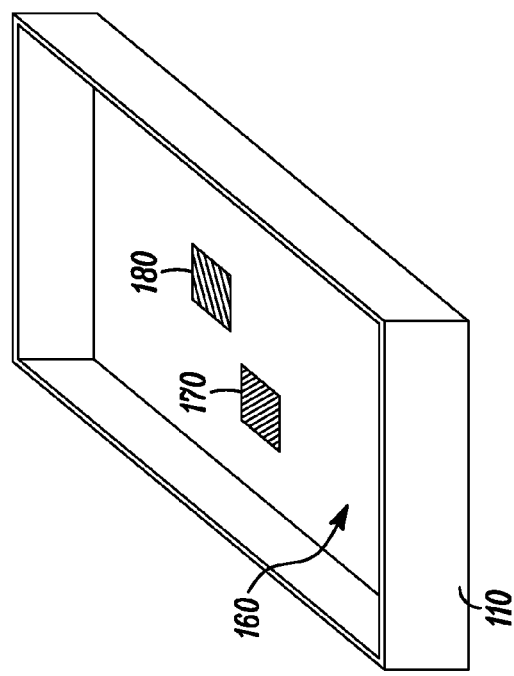

FIG. 2(a) illustrates an exemplary touch input device configured to detect tactile inputs. Such inputs may be interpreted as making a selection, opening a file or document, executing an instruction, starting a program, viewing a menu, and the like. The actions may also include moving an object such as a pointer or cursor or an icon on a display screen. The touch input device can be configured to operate as both an input and output interface, e.g., a touch pad and a display respectively. In other words, in some embodiments, the touch pad is integrated onto a display device that forms an integral part of an electronic device, such as a PED, or that is an external accessory thereto. In other implementations, the touch pad is separate from any display device.

In FIG. 1, the tactile input device comprises first and second sensors 170, 180 that produce different outputs in response to a particular tactile input wherein the differential output of the sensors is interpreted to correspond to an intended input. To generate a differential output signal, the first and second sensors detect or sense an input in or along at least one common dimension, direction or axis. The common axis may be in the x-y plane parallel to a surface of the touch interface or along the z-axis perpendicular to the x-y plane, or some combination thereof. Inputs along or about these axes may be produced by normal, lateral or rotational motion or to some combination thereof at the tactile input area of the pliable surface. Although, only two sensors are disclosed in the examples discussed herein, other embodiments may concatenate multiple sensors to detect motion along each dimension of interest.

The first and second sensors are generally configured such that the first and second sensors produce different outputs in response to a particular tactile input at the touch input device. Such a configuration may be implemented by physically separating the sensors and/or by embedding the sensors in materials having different degrees of pliability. In one embodiment, the first sensor is coupled to a pliable surface such that tactile interaction with the pliable surface produces an output by the first sensor. For example, the first sensor may be (1) simply attached to the back of the pliable surface using an adhesive; (2) embedded within or below the touch area of the pliable surface; or (3) molded into the pliable surface. In the above exemplary arrangements, the first sensor constitutes at least a portion of the touch area of the pliable surface such that tactile interaction with the first sensor causes displacement of the sensor within the pliable material. In another embodiment, the first sensor may be placed on an internal printed circuit board that is mechanically isolated from the remainder of the printed circuit board. In this arrangement, both the first sensor and the second sensor could be adjacent to each other on a printed circuit board, wherein the first sensor has a mechanical cutout around it and is connected to the pliable surface.

The second sensor may also be embedded within pliable material forming the pliable surface so long as the second sensor produces a different output relative to the output of the first sensor in response to a given tactile input. For example, the second sensor can be placed on a printed circuit board within the housing. In another embodiment, the second sensor is disposed on or in a smaller printed circuit board attached to a main printed circuit board by a flexible connector; it could be attached by adhesive to the interior surface of the housing, e.g., on a back surface of the housing if the first sensor is coupled to the front surface of the housing having the pliable surface.

In FIG. 2a, the first sensor 170 is disposed within the pliable surface 160 located on a broad face of the housing 110 and the second sensor 180 is disposed within the housing 110. A similar configuration is illustrated in FIG. 3a. In FIG. 2a, the pliable surface 160 generally includes a contact or tactile interaction surface on a user accessible portion of the housing 110 wherein the pliable surface can be deformed, usually imperceptibly, by a force exerted by a tactile input caused by interaction with a body part, stylus or other instrumentality. Generally, the pliable surface is a compliant portion of the touch input device that responds to normal, lateral or rotational motion or to some combination of such inputs. Such input forces are thus imparted to at least one of the first and second sensors. To the extent that the input forces are imparted to both sensors, the input forces are imparted differentially. The pliable surface may be substantially planar, curved, textured, or the like.

In one implementation, the first and second sensors are both dynamic force sensors capable of measuring motion or detecting an input along at least one common dimension, direction or axis. Dynamic force sensors typically detect some movement that occurs in response to an applied force. Examples of such motion sensors include accelerometers e.g., MEMS and piezoelectric based devices, and gyroscopes among other sensors.

The use of a differential force sensor eliminates the need for precise assembly of force sensors that rely on static displacement into the device surface. This reduces the cost and assembly complexity of force sensor implementation. Moreover, the use of a differential sensor signal to detect or measure tactile inputs removes motion artifacts and motion due to unintentional gestures, as will be explained in more detail below. The differential sensor arrangement reduces the likelihood that sudden displacements of the touch input device are not interpreted as push or release input events. Using a differential sensor, for example, motion of the touch input device resulting from walking and overall movement of the device will not result in false inputs, since such motion imparts the same force to both the sensors. In FIG. 1 for example, both the first and the second sensors (170, 180) sense the same force from the unintended motion of the device 100. Therefore, a relative movement between the first sensor 170 and the second sensor 180 will be zero and counted as a false input. In some embodiments, when the difference between the two sensor signal outputs is zero or below a predetermined threshold, the touch input may also be discarded as noise. Such a threshold may be based on modeling or experimental or empirical evidence.

In FIGS. 2b-2d, generally, when a tactile force is applied perpendicular or normal to the pliable surface, the first sensor 170 is subject to or detects force in the normal direction. Generally, a normal force applied to the tactile input device may be a component of a force having both lateral and normal components. The first sensor then translates the received input into an electrical output signal that is proportional to the tactile input. The second sensor 180 is also subject to or detects a normal force in the same direction as the first sensor. The second sensor then also translates the received input into a proportional electrical output signal. The output of each of the first and second sensors is coupled to a processor, for example, the processor 120 in FIG. 1. However, the input detected by each of the first and second sensors is different and thus the output signals produced by the first and second sensors are also different. The processor thus receives the different output signals produced by the sensors and interprets the differential signal as an input signal in response to the normal force applied to the tactile input device. The removal of the normal force also results in the generation of output signals by the first and second sensors which may also be interpreted as a tactile input by the processor. The processor may be configured to map the input signals to one of several different input commands depending on the context in which the normal tactile inputs were received.

In FIGS. 3b-3d, generally, when a tactile force is applied parallel or substantially parallel to the pliable surface, the first sensor 170 is subject to or detects force in the direction along an x-y plane parallel to the pliable surface. Generally, a lateral force applied to the tactile input device may be a component of a force having both normal and lateral components. The first sensor then translates the received input into an electrical output signal that is proportional to the tactile input. Similarly, the second sensor 180 is also subject to or detects the lateral force in the same direction as the first sensor. The second sensor then also translates the received input into a proportional electrical output signal. An output of each of the first and second sensors is coupled to a processor, for example, the processor 120 in FIG. 1. However, the input detected by each of the first and second sensors is different and thus the output signals produced by the first and second sensors are also different. The processor thus receives different output signals produced by the first and second sensors and interprets the differential signal as the input signal in response to the lateral force applied to the tactile input device. The removal of the lateral force also results in the generation of output signals by the first and second sensors which may also be interpreted as a tactile input by the processor. The processor may be configured to map the input signals to one of several different input commands depending on the context in which the lateral tactile inputs were received.

Figure 4B:
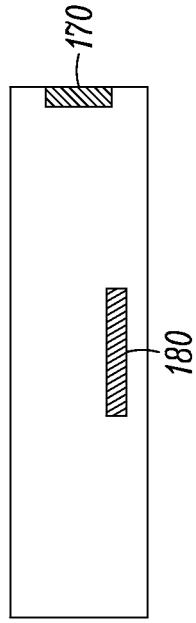
FIG. 4 illustrates a sensor arrangement in a touch input device of a portable electronic device.
Figure 4C:
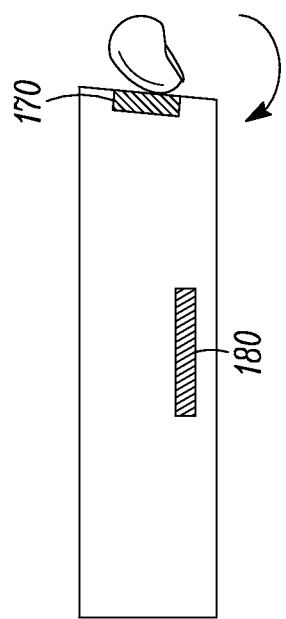
Figure 4D:
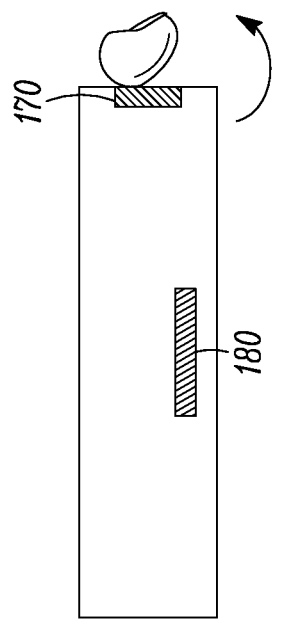
Figure 4A:
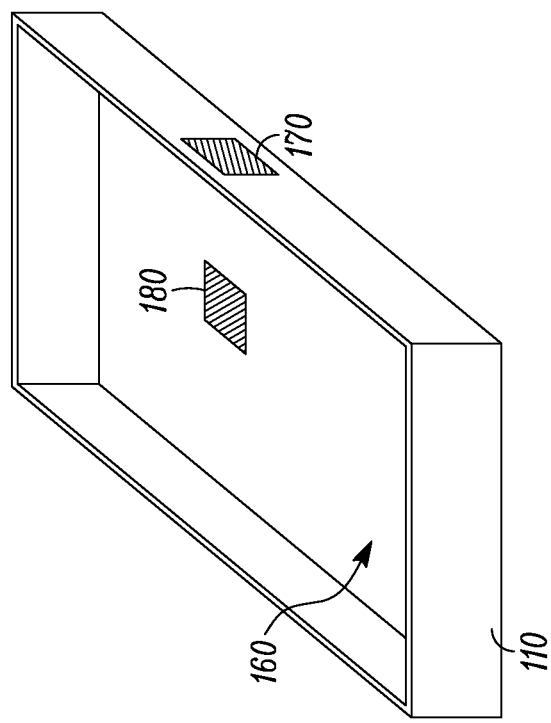

In FIG. 4a, the first sensor 170 is disposed within a pliable surface 160 located on a narrow side of the housing 110 and the second sensor 180 is disposed within the housing 110. The pliable surface 160 generally includes a contact or tactile interaction surface on a user accessible portion of the housing 110 wherein the pliable surface can be deformed by a force exerted by a tactile input caused by interaction with a body part, stylus or other instrumentality. The pliable surface 160 is a compliant portion of the touch input device that responds to rotational input forces that are imparted to at least one of the first and second sensors. To the extent that a legitimate rotational input force is imparted to both sensors, the input force is imparted differentially.

In FIGS. 4b-4d, generally, when a rotational tactile force is applied to the pliable surface, the first sensor 170 is subject to or detects rotation force and then translates the received input into an electrical output signal that is proportional to the tactile input. Similarly, the second sensor 180 is also subject to or detects the rotation force in the same dimensions or about the same axis as the first sensor. The second sensor then also translates the received input into a proportional electrical output signal. An output of each of the first and second sensors is coupled to a processor, for example, the processor 120 in FIG. 1. However, the input detected by each of the first and second sensors is different and thus the output signal produced by each of the sensors is also different. The processor thus receives different output signals produced by the first and second sensors and interprets the differential signal as the input signal in response to the rotation input applied to the tactile input device. The removal of the rotational force also results in the generation of output signals by the first and second sensors which may also be interpreted as a tactile input by the processor. The processor may be configured to map the input signals to one of several different input commands depending on the context in which the rotational tactile inputs were received.

Figure 5:
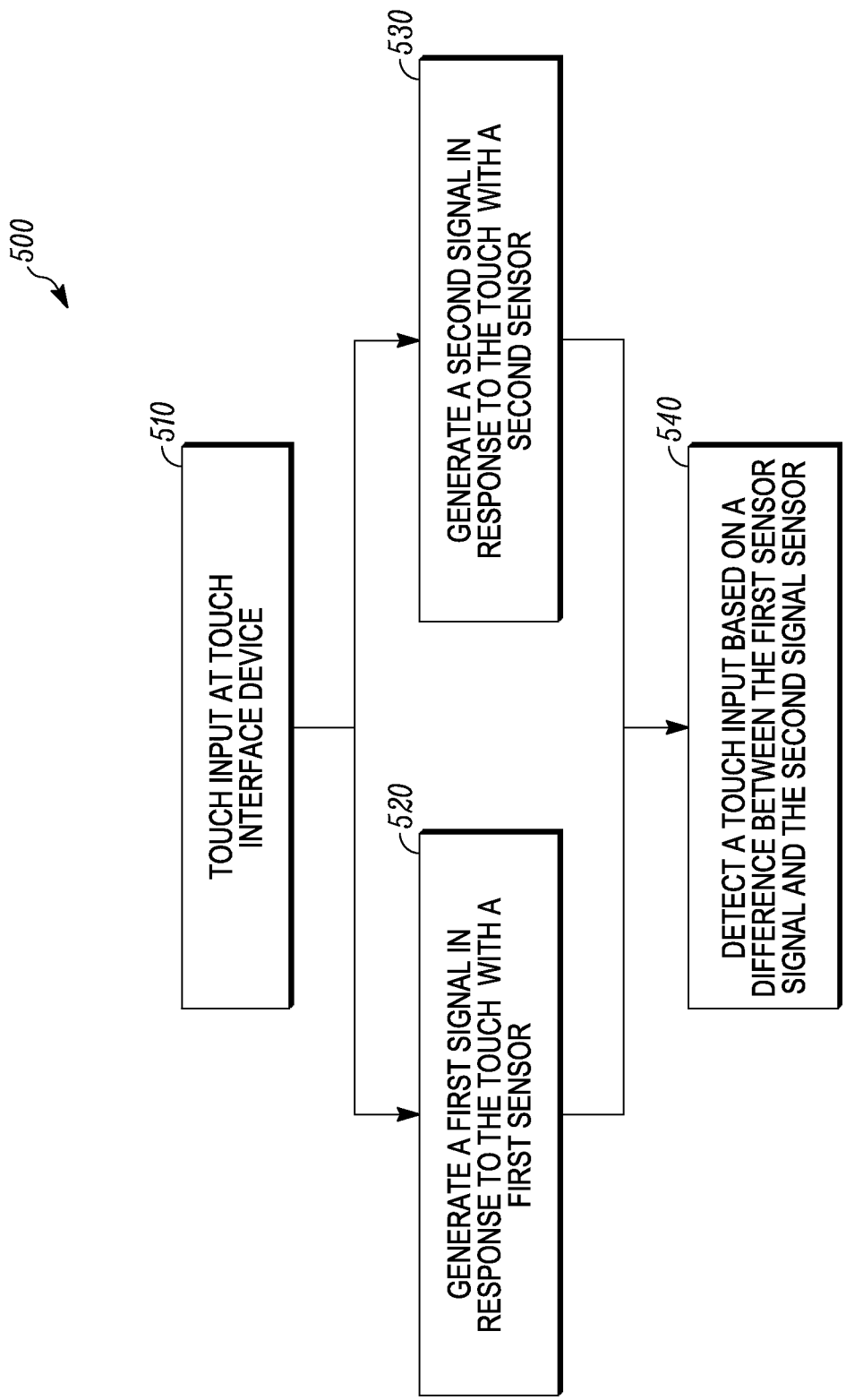
FIG. 5 is a flowchart of a method of detecting a touch input in an electronic device.

FIG. 5 is a process flow diagram 500 for detecting a tactile or touch input at a touch interface device. At 510, a tactile input is provided by or through interaction with or at a tactile user interface, for example, the pliable surface 160 of the touch input device 150 in FIG. 1. In FIG. 5, at 520, a first signal is generated by a first sensor in response to the touch input at the touch interface device. Similarly, at 530, a second signal is generated by a second sensor in response to the touch input at the touch interface device. The generation of the first and second signals by the first and second sensors at blocks 520 and 530 occurs simultaneously or substantially simultaneously in response to the touch input at the touch interface device. At 540, a touch input is determined based on a difference between the first sensor signal and the second sensor signal.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A method of detecting a touch input in an electronic device, the method comprising:
   generating a first signal in response to a touch input that is pivotal about an axis normal to a surface of a pliable portion of the electronic device with a first sensor embedded in the pliable portion of the electronic device;
   generating a second signal in response to the touch input at the surface of the pliable portion of the electronic device with a second sensor removed from the pliable portion of the electronic device; and
   detecting the touch input that is pivotal about an axis normal to the surface of the pliable portion of the electronic device based on a difference between the first sensor signal and the second sensor signal.

2. An electronic device comprising:
   a processor disposed within a housing of the electronic device; and
   a touch input device coupled to the processor,
   the touch input device comprising a compliant portion with a touch input surface, a first input sensor embedded in the compliant portion of the touch input device, and a second input sensor, the first and second sensors are coupled to the processor,
   the first input sensor pivotal about an axis normal to the touch input surface in response to a touch input at the touch input surface of the compliant portion of the touch input device,
   the processor configured to detect relative pivotal movement between the first and second sensors in response to the touch input at the touch input surface of the compliant portion of the touch input device,
   wherein the relative pivotal movement between the first and second sensors is proportional to an input of the touch input device.

3. The device of claim 2 wherein the first and second input sensors are accelerometers.

4. The device of claim 2, wherein the first input sensor and the second input sensor are dynamic force sensors.

5. The device of claim 2, wherein the exterior surface forms a part of the housing.

* * * * *